United States Patent [19]
Keller et al.

[11] Patent Number: 5,509,736
[45] Date of Patent: Apr. 23, 1996

[54] LINEAR GUIDING DEVICE

[75] Inventors: Werner Keller, Wasserlosen; German Dutsch, Schweinfurt; Roland Hartmann, Grettstadt-Durrfeld, all of Germany

[73] Assignee: Deutsche Star GmbH, Schweinfurt, Germany

[21] Appl. No.: 302,119

[22] Filed: Sep. 7, 1994

[30] Foreign Application Priority Data

Sep. 10, 1993 [DE] Germany .......................... 43 30 772.8

[51] Int. Cl.⁶ .................................................. F16C 29/06
[52] U.S. Cl. .................................... 384/45; 384/13
[58] Field of Search .............................. 384/43, 44, 45, 384/15, 13

[56] References Cited

U.S. PATENT DOCUMENTS

| | | | |
|---|---|---|---|
| 4,743,124 | 5/1988 | Blaurock | 384/45 |
| 4,850,720 | 7/1989 | Osawa | 384/13 |
| 4,921,358 | 5/1990 | Kasuga | 384/15 |
| 4,988,215 | 1/1991 | Osawa | 384/45 X |
| 5,137,371 | 8/1992 | Osawa | 384/45 |
| 5,139,347 | 8/1992 | Hattori | 384/15 |
| 5,445,455 | 8/1995 | Holweg | 384/45 |

FOREIGN PATENT DOCUMENTS

| | | |
|---|---|---|
| 0120093 | 10/1984 | European Pat. Off. . |
| 0211243 | 2/1987 | European Pat. Off. . |
| 4210142 | 10/1992 | Germany . |
| 4141038 | 6/1993 | Germany . |
| 4210299 | 9/1993 | Germany . |
| 9312351 | 6/1993 | WIPO . |

*Primary Examiner*—Thomas R. Hannon
*Attorney, Agent, or Firm*—Brumbaugh, Graves, Donohue & Raymond

[57] ABSTRACT

A main body of a bearing (12) is guided on a guide rail (10) by at least one rolling-element circuit (14, 16) and receives at one end an end plate (13). A deflection duct (50, 52) is recessed in the end plate and receives a deflection piece (60), which crosses the deflection duct (50, 52). A lubricant-supply system (86) for the rolling-element circuit (14, 16) is provided inside the end plate (13). The lubricant-supply system (86) is partly within a deflection-piece receiver duct (58) which accommodates the deflection piece (60). The lubricant-supply system (86) includes a lubricant channel (92) which runs entirely within the end plate (13) so that it is encapsulated completely by the material of the end plate (13).

43 Claims, 8 Drawing Sheets

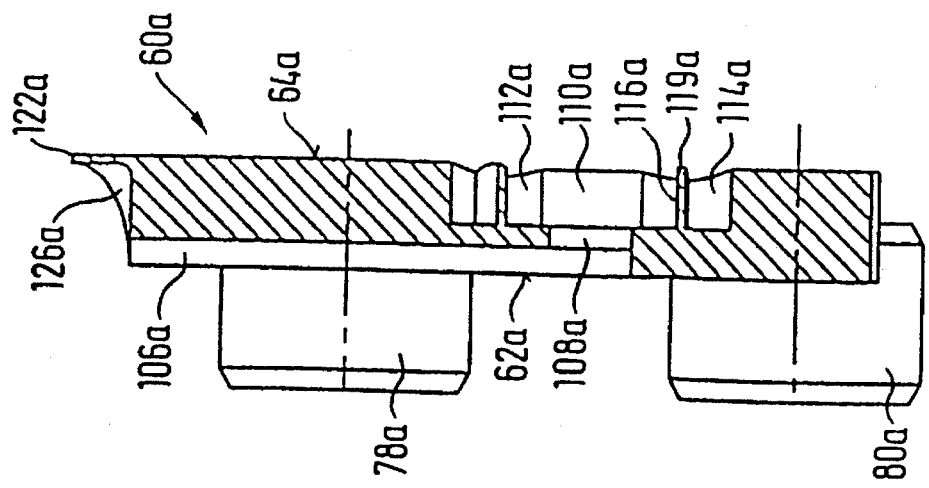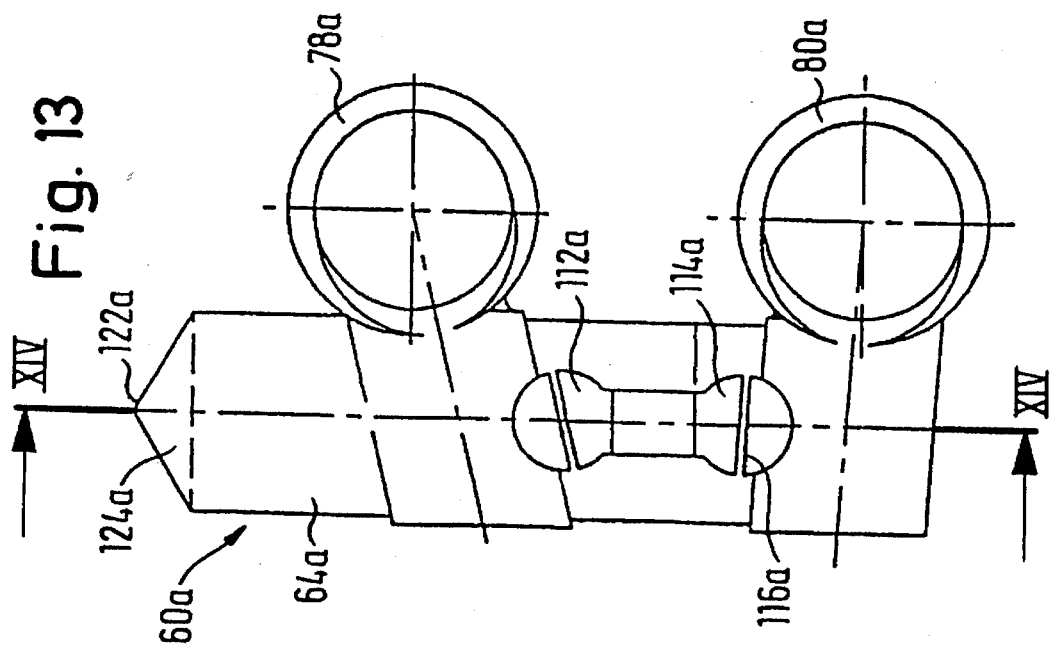

LINEAR GUIDING DEVICE

BACKGROUND OF THE INVENTION

The invention relates to a linear guiding device of the type having a guide rail with a longitudinal axis and a main body of a bearing that is guided by rolling-element circuits along the guide rail. An end plate is attached to at least one end surface of the main body of the bearing, the end plate having a contact surface facing one of the end surfaces of the main body of the bearing. A deflection duct, which is recessed into the contact surface of the end plate, is provided for at least one rolling-element circuit, the defection duct constituting an outer deflecting surface for a deflection-arc segment of the rolling-element circuit. A receiver duct, which is also recessed into the contact surface, receives a deflection piece. The receiver duct crosses the deflection duct, in order that the deflection piece may also cross the deflection duct. The deflection piece faces, with a breast surface located near the end surface, the end surface of the main body of the bearing, and the deflection piece has in addition a convex back surface located opposite the outer deflecting surface, the back surface forming for the deflection-arc segment an inner deflecting surface located opposite the outer deflecting surface. At least one portion of a lubricant-supply system for the rolling-element circuit, of which there must be at least one, is contained in the end plate in a location inside the receiver duct accommodating the deflecting piece and is open toward the rolling elements of the rolling-element circuit in the area of the inner deflecting surface of the deflecting piece.

A linear guiding unit of the type described above is known from EP-B10 211 243 and from the corresponding U.S. Pat. No. 4,743,124.

In the known embodiments, the lubricant-supply system is formed over a considerable portion of its length by a lubricant channel recessed into the contact surface of the end plate, which channel is covered by being fitted against the end surface of the main body of the bearing and is connected at each of its ends with a receiver duct accommodating the deflecting piece.

In each of the two deflection-piece receiver ducts, there is accommodated a deflection piece. By means of the deflection piece and the respective deflection-piece receiver duct, there are formed end-distribution regions of the lubricant-supply system, located close to the rolling elements. In other words, under these circumstances, the lubricant distribution is based on the principle of creating, within the contact surface of the respective end plate, a duct system which is totally open towards the contact surface; in the region of the deflection-arc segments of the rolling-element circuits, the duct system is then completed by the deflecting pieces pertaining to them.

From EP-A1-0 120 093, there is known a linear guiding device which also has end plates at the end surfaces of the main body of the bearing. Once again, this form of embodiment provides, in the end plates, at least a part of a lubricant-supply system to supply with lubricant the deflection-arc segments of the circuits of rolling elements. In that case, a lubricant channel constituting a significant portion of the length of the respective end plate's lubricant-supply system consists of a sandwich-type superposition of an intermediate plate and a cover plate, which together form the end plate. The lubricant channel is defined in its cross-section by a slot of the intermediate plate and is completed by the cover plate.

SUMMARY OF THE INVENTION

The invention addresses the task of creating, for a linear guiding device of the type described at the outset, a lubricant-supply system in the region of the at least singular end-plate, which system would permit, using a simple construction, achieving improved sealing properties for the lubricant, particularly when low-viscosity and liquid lubricants are used.

In order to solve this task, it is proposed according to the invention that the lubricant-supply system encompass a lubricant channel running within the end plate, which is entirely defined as a channel cross-section by the material of the end plate, and which, in a region proximate to the deflection-piece receiver duct, is connected with that portion of the lubricant-supply system that is accommodated in the deflection-piece receiver duct.

In particular, the lubricant channel may be produced within the material of the end plate, when the end plate is manufactured by injection molding or casting, by means of an appropriate channel-forming core in a manner such that the channel cross-section is defined by the material of the end plate in a single piece.

The design of the lubricant channel according to the invention seems at first sight to be more expensive than the known solutions according to the known patent documents as discussed above, because of the complicated production and casting processes. Furthermore, the solution according to the invention appears to be illogical, to the extent to which the lubricant-supply system is partly enclosed within the end plate, yet partly lies free towards the contact surface of the end plate—specifically, in the region of the deflection-piece receiver ducts.

However, it was found that the design of the lubricant-supply system according to the invention provides considerable advantages: there are considerable difficulties in properly sealing a lubricant-supply system which is accommodated within the end plate. It should also be kept in mind that, first of all, a lubricant addition has to be carried out under considerable pressure, in order to insure the perfect supply of all regions requiring lubrication. If the lubricant is distributed over extended surfaces and linear paths in the lubricant-supply system, and if the channel paths are delimited by surface sections which abut against each other in sandwich fashion, there will result considerable forces because of the lubricant pressure, which forces will try to lift off the end plate in the contact region of its surface abutting with the end surfaces of the main body of the bearing. On the other hand, since the end plates must carry out a guide function for the rolling elements such as roller balls, they must be manufactured from a relatively hard synthetic material in a manner such that there may appear—within the contact region of the abutting surface of the end plate, on one hand, and of the end surface of the main body of the bearing, on the other hand—leaks caused by micro-unevennesses. What is more, the latter cannot be completely eliminated by tightening the end plates against the main body of the bearing, using relatively high tightening forces—particularly when low-viscosity or liquid lubricants are used. Nor can the end plates be clamped against the end surfaces of the main body of the bearing with any desired magnitude of tightening force, since such tightening forces may cause distortion of the end plates. Such distortion could impair the guiding properties of the deflection ducts for the deflection-arc segments of the rolling-element circuits (which deflection ducts are formed within the end plates) as a consequence of the elastic distortion of the end plates. Nor can one simply insert sealing gaskets between the end surfaces of the main body of the bearing and the contact surfaces of the end plates, as would be the case between, say, the head surface of an internal-combustion engine and the cylinder head. This is so because tightening the end plates against the respective end surface of the main body of the bearing may generate imperfections in the overall lengthwise dimension of the rolling-element circuits—imperfections which might impair the friction-free recirculation of the rolling elements within the rolling-element circuits.

In the design according to the invention of the linear guiding device in general and of the end plates in particular, the areas in which lubricant pressure and sealing problems might appear between abutting surfaces of the end plates and the main body of the bearing are reduced to the relatively small region of the deflection pieces. Consequently, it is possible to achieve a sufficient sealing action by the skillful placement in this region, of tightening bolts or similar elements. On the other hand, in the much longer lubricant-conveying regions, the sealing problem is completely eliminated by the fact that, there, the lubricant channels run completely encapsulated within the end plates. Also, the pressure of the end plates against the end surfaces of the main body of the bearing no longer constitutes a problem.

For reasons of manufacturing technology it is recommended that the receiver duct accommodating the deflection-piece feature an end segment which, in its lengthwise direction, should be distant from a crossing-point with the respective deflection duct. The end segment should lie in a region proximate to the lubricant channel, it also being recommended that at that point there be arranged a connection between the lubricant channel and that portion of the receiver duct accommodating the deflection-piece which lies within the lubricant-supply system. In this manner, this connection is shortened to a minimum, a fact which is of great advantage from a manufacturing-technique viewpoint, in particular in the case of injection-molding or casting of the end plates.

In accordance with the construction of the end plates—a construction which, as a rule and as a matter of preference, is relatively shallow and shaped as a disk—it is proposed that the lubricant channel run essentially parallel to the contact surface of the respective end plate and that it cross or intersect the deflection piece receiver duct in a region of the duct bottom which is adjacent to the back surface of the deflection piece; in that case, one can establish a connection between the lubricant channel and that portion of the lubricant-supply system which lies within the deflection-piece receiver-duct, in the region of this crossing and/or intersection. This, too, is advantageous from a production-technique viewpoint, simplifying and lowering the cost of the molds required for the injection-molding or casting of the end plates.

As already shown in EP-B1-0 211 243, it is possible to provide the portion of the lubricant-supply system lying within the deflection piece receiver duct, with a breast-surface slot; the slot runs in the lengthwise direction of the deflection piece in the latter's breast surface, and is covered by the end surface of the main body of the bearing. The lubricant outflow is further reduced in that any possible lubricant leakage loss is prevented not only by the contact between the end-plate contact surface and the main-body end surface, but additionally by the contact between the back surface of the respective deflection piece and the duct bottom surface of the deflection-piece receiver duct. In that case, the breast-surface slot can be connected with the lubricant channel by means of a primary cross-channel on the side of the deflection piece, which channel traverses the deflection piece in a manner essentially orthogonal to the breast surface. From the viewpoint of forming technology, this, too, is advantageous insofar as the manufacture of the deflection piece is concerned. At the same time, it also produces an advantageous design of the end plate, because this primary cross-channel on the deflection-piece side may be connected to a cross-channel on the end-plate side, which latter channel also runs orthogonally to the contact surface of the end plate and is connected to the lubricant channel. Furthermore, at the end facing the rolling elements in the lubricant flow, the breast-surface slot may be connected via a secondary cross-channel on the deflection-piece side to a lubricant discharge system in the region of the back surface of the deflection piece. This, too, is advantageous from a production-technique viewpoint, because essentially it only involves the forming of the deflection piece, which in itself is rather simple in design.

In the case of many forms of embodiment—in particular in those in which a U-shaped main body of the bearing is arranged on a guide rail, the rolling-element circuits being each arranged between a leg of the U-shaped main body of the bearing and a side surface of the guide rail—it is customary to provide two or even three rolling-element circuits between the guide rail and the respective leg of the main body of the bearing. In that case, one requires in principle one deflection piece for the deflection-arc segment of each rolling-element circuit. It is possible to assign one and the same deflection piece to the deflection-arc segments of two or three or even several rolling-element circuits, if these possess approximately or precisely the same axes of curvature. If two or more deflection-arc segments of different rolling-element circuits are served by a common deflection piece, it is possible to arrange the secondary cross-channel on the deflection-piece side in a manner such that it traverses the deflection piece at a point between respective crossing points of the deflection piece with the various deflection-arc segments—e.g., between two deflection-arc segments. In order to avoid the need for several passages through the deflection piece, one can connect the secondary cross-channel on the deflection-piece side with a discharge duct which is arranged in the convex back surface of the deflection piece and runs essentially parallel to the latter's lengthwise dimension. The discharge duct is covered by a duct-delimiting surface of the deflection piece receiver duct, and runs from the secondary cross-channel on the deflection-piece side to one deflection duct of two adjacent deflection-arc segments.

In lubricant-supply systems of the linear guiding devices discussed here, there often arises the problem of having to supply lubricant in a uniform manner to different lubricant-consuming points. In principle, this requirement can be met by designing the flow-through resistances to the individual lubricant-consuming points so as to make them approximately uniform. However, this can occasionally lead to increased requirements in the precision of the lubricant-channel manufacture. Consequently, in order to ensure that the precision attainable with the ordinary techniques of casting and injection-molding production be sufficient, it is advantageous to provide, within the lubricant-distribution system inside the end plate, at least one throttle point or a check-valve and/or excess-pressure valve. In that case, the flow-through resistances are determined by one or several throttle points or else by one or several check-valve and/or excess-pressure valves. Thus, for instance, if one wishes to connect the consumption-side end of a lubricant-supply system with two consumption points, it is relatively simple to design in each of the two branches one throttle point or one check-valve and/or excess-pressure valve in a manner such that these offer an approximately equal flow-through resistance to the lubricant going to each of the consumption points. In this case, it is ensured that when the lubricant-supply pressure is applied, both consumption points are supplied with lubricant in a sufficient and uniform manner. In the absence of such throttle point or check-valve and/or excess-pressure valves, it may occur—because of the unavoidable manufacturing tolerance variations in the lubricant supply flow paths and because of the inevitable leakages of the individual consumption points—that the lubricant (in particular a low-viscosity or liquid lubricant) will flow preferentially to one of the consumption points and possibly be lost there through leakage, while one or several other consumption points are not sufficiently filled and supplied with lubricant.

In principle, the throttle points or check-valves and/or excess-pressure valves may be located at any desired points within the lubricant-distribution system. One can achieve a maximum of uniformity in the supply of individual lubricant-consuming points if at least at one discharge point of the portion of the lubricant-supply system (which is accommodated within the deflection-piece receiver-duct) supplying a deflection-arc segment, there is arranged a check-valve and/or excess-pressure valve, which in any event is open towards the deflection-arc segment. If two deflection-arc segments are assigned to the deflection-piece receiver-duct in question, two check-valves and/or excess-pressure valves will be connected upstream from the deflection-arc segments; each of them leads to a consumption point—i.e., each leads to a deflection-arc segment. In this fashion, one ensures a uniform supply of the two (or even more) consumption points, even if the normal supply paths to these consumption points vary in their cross-sections, and/or different leakage points are located downstream of the two consumption points. The check-valves and/or excess-pressure valves are to be designed in a manner such that in any event they open towards the deflection-arc segment which they are designed to supply. While it is in particular the excess-pressure function of the individual check-valve and/or excess-pressure valves which is responsible for the uniform supply of individual consumption points, the check-valve function may be important in a different situation: one must recognize the possibility that the linear guiding device will be mounted with spatially different orientations. In that case, it is possible (in particular in the case of low-viscosity and liquid lubricants) that there occur a lubricant return-flow from the respective lubricant consumption-point into the lubricant-supply system and/or a transfer of lubricant from one consumption point to another consumption point. As a result one or several consumption points are excessively supplied with lubricant and others are under supplied. If to each of these consumption points a valve with check-valve effect is assigned, then this risk is eliminated. A check-valve effect is meant to signify that a valve will offer a smaller resistance in a first flow-through direction—i.e., in particular in the flow-through direction towards the respective consumption point—while a return flow from the consumption point to the lubricant-supply system is subjected to a greater flow-through resistance.

A throttle point may be formed by a narrowing of the lubricant channel. In the case of a check-valve and/or an excess-pressure valve, one may resort to a valve blade capable of being elastically deflected outward and produced in one piece with the deflection piece. If one deflection piece is assigned to several deflection ducts, one can provide, in a discharge duct that supplies the several deflection ducts, at the ends that face each deflection duct, one check-valve and/or one excess-pressure valve for each deflection duct. In particular, each such check-valve and/or excess-pressure valve may be designed as a blade-type valve, in which a blade is formed in one piece with the deflection piece into which the discharge duct is built. In so doing, the blade-type valve may be arranged in a valve chamber of the deflection piece which partially covers the respective deflection duct. In order to make it possible to define as precisely as possible the excess-pressure and/or check-valve function of the valve while keeping production costs down, the blade-type valve may be designed with a valve blade having a free edge which faces the back surface of the deflection piece, while at the same time leaving the margin of the valve blade essentially connected in one piece with the deflection piece. In that case, the valve blade—which with its main surface lies essentially perpendicular to the direction of the discharge duct—yields in accordance with the direction of flow-through. By means of simple structural changes, its yield resistance may be varied, as a function of the flow-through direction; in this manner both the excess-pressure function and the check-valve function may be adjusted as desired. Thus, for instance, the free edge of the valve blade which faces the back surface of the deflection piece may be arranged in a manner such that it coincides with a delimiting edge of the deflection duct. In that case, if there occurs an excess pressure in a first direction, there will be a drop in the flow-through resistance. It is also possible to arrange a check-valve and/or excess-pressure valve in the region of a connecting point between the lubricant channel and the portion of the lubricant-supply system that lies within the deflection-piece receiver duct.

If the guide rail is enveloped by the main body of the bearing in an essentially U-shaped manner, and if accordingly the main body of the bearing is designed with one crosspiece part and two leg parts (where, between each of the leg parts and a pertinent side surface of the guide rail, there is provided at least one rolling-element circuit, preferably two or several rolling-element circuits), there results a corresponding U-shaped design for the end plate and/or end plates as well. In other words, this means that the end plate will in turn be designed in an essentially U-shaped manner with one end-plate crosspiece portion and two end-plate leg portions. In that case, it is practical to design into each of the end-plate leg portions a corresponding number of deflection ducts. If two deflection ducts are present in one end-plate leg portion, one can assign to them a common deflection-piece receiver duct and a common deflection piece. In the case of such a U-shaped construction, it is recommended that the deflection-piece receiver duct and the respective deflection piece extend each to the height of the end-plate crosspiece part, and that at the height of the end-plate crosspiece part they be connected with the lubricant channel, said lubricant channel running within the end-plate crosspiece part. A particularly simple design form—both from a casting technique and an injection-molding technique viewpoint—is achieved if the lubricant channel runs completely through the end-plate crosspiece part, between two side-surfaces of the two end-plate leg portions.

In that case, it is possible to connect the lubricant channel in a central region of the end-plate crosspiece part with a lubricant connection point. However, it is also possible—either additionally or alternatively—to connect the lubricant channel to at least one side-surface of an end-plate leg portion with a lubricant connection. If several lubricant connections are available, a further check-valve should be provided at each of these lubricant connections so that, if the lubricant is introduced via one lubricant connection, the lubricant cannot again exit through another possibly available lubricant connection.

In principle, a lubricant channel running within an end plate may be designed with a circular cross-section. However, since the end plate must be connected to the end surface of the main body of the bearing, and since it is possible that for that purpose several connecting bolts must be inserted through the end plate into the main body of the bearing, it may be advantageous to provide an oblong cross-section for the lubricant channels. In that case, the lengthwise cross-section axis should be roughly parallel to the lengthwise axis of the guide rail. This provides the advantage that, for the same flow-through cross-section, the available surface content of the end plate is less diminished through the passage of connecting bolts to the main body of the bearing. Thus, for instance, the cross-section of a lubricant channel running within the end plate may be designed in half-moon fashion, with the lengthwise axis of the half-moon-shaped cross-section lying essentially parallel to the lengthwise axis of the guide rail.

With different guide tasks, it often becomes necessary to provide different widths of the guide rail—hence, a different length of the crosspiece of the pertinent main body of the bearing. This leads to correspondingly different crosspiece lengths of the U-shaped end-plates belonging to the different main bodies of the bearings. In such a situation, it is proposed—in order to avoid excessively high forming expenditures for the production of end plates and of the different crosspiece lengths—that the end plate be capable of being put together, building-block-wise, from a plurality of partial end-plates; in that case, in the individual partial end-plates there are arranged parts of the lubricant-supply systems forming an essentially tight connection when the partial end-plates are assembled into the end plate. This principle is applicable not only in the case of U-shaped end-plates, but also in general. In the case of U-shaped end-plates, however, it is of particular importance: in order to connect the parts of the lubricant-supply system of the individual partial end-plates, plug-in type connecting-elements may be injection-molded or cast in one piece into these partial end plates. When the partial end-plates are assembled, they will obligatorily have to produce an essentially tight plug-in type connection. Thus, for instance, these plug-in type connecting-elements may be made up of complementary, preferably conical, projections and recesses in the abutting surfaces of the partial end plates. In the case of a U-shaped end plate, each partial end-plate may be assembled from two leg-end-plates—each with one end-plate crosspiece section close to the leg, and one central end-plate crosspiece section.

As already known from EP-B1-0,211,243, at least one guide crosspiece for guiding the rolling elements may be attached (or cast in or injected in, in one piece), in the region of the main body of the bearing.

The smooth transition of the rolling elements can be further improved by forming at least one positioning ring onto the deflection piece. The positioning ring is designed to be accommodated in an enlargement at the end of a rolling-element return bore of the main body of the bearing, and/or in a recess of the end plate which is adjacent to a deflection duct. In this fashion, one also facilitates, during assembly, the correct position in the mutual arrangement of the end plate, the main body of the bearing, and the respective deflection piece.

The end plates and/or the deflection pieces may be injection-molded or cast out of synthetic material. The main body of the bearing and the guide rail may be made of metal, in particular, steel. However, it is also conceivable to make the main body of the bearing and/or the guide rail out of light metal, possibly making the running surfaces of steel. In the case of running surfaces of the main body of the bearing, it is also conceivable to arrange pivoting metal-plates on a base construction of light metal (e.g., aluminum), which will form the running surfaces for the rolling elements. The rolling elements may, in principle, consist of balls or cylindrical or barrel-shaped rollers.

DESCRIPTION OF THE DRAWINGS

The invention is explained by means of examples of embodiments in the attached figures, in which:

FIG. 13 is a view of the deflection piece in FIG. 12 in which the piece is viewed from the rear; and FIG. 14 is a section along line XIV—XIV in FIG. 13.

DESCRIPTION OF THE EMBODIMENT

Figure 1:
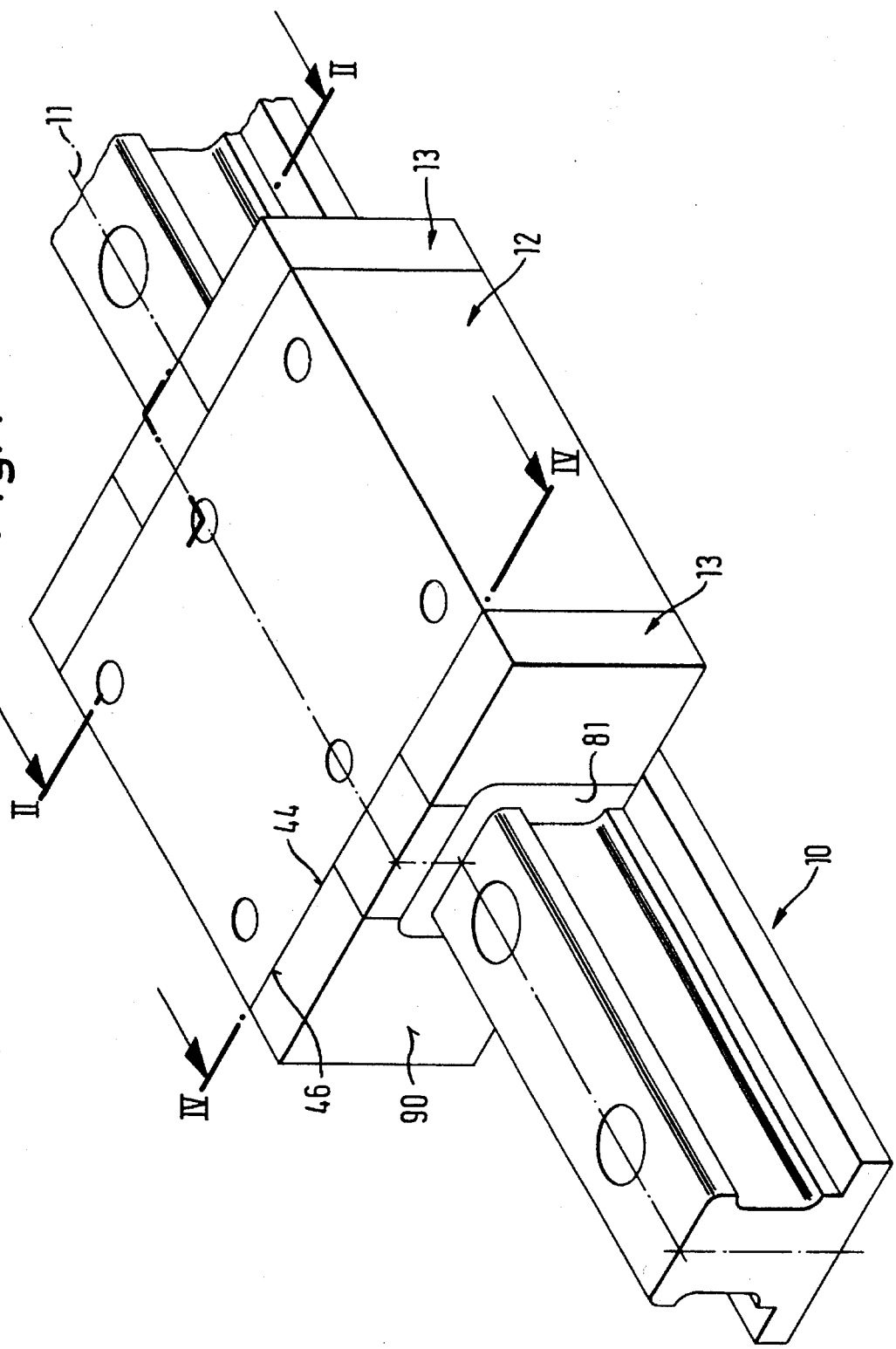
FIG. 1 is a perspective view of a linear guiding device in accordance with the invention.
Figure 2:
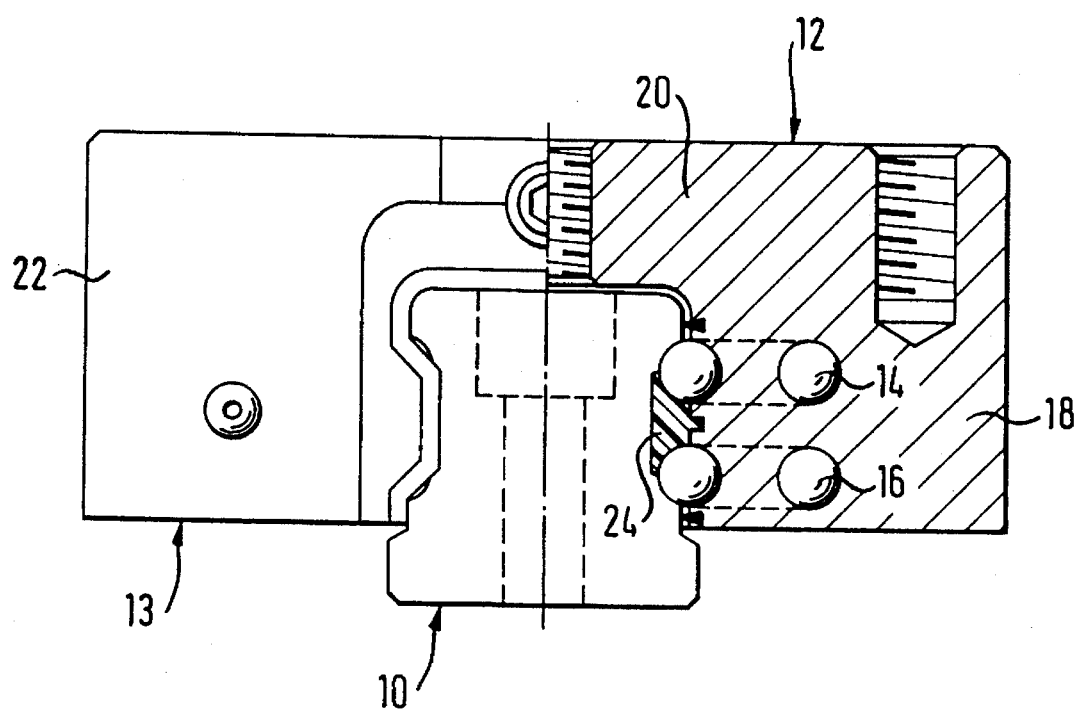
FIG. 2 is a partial cross-sectional view taken along line II—II of FIG. 1.
Figure 3:
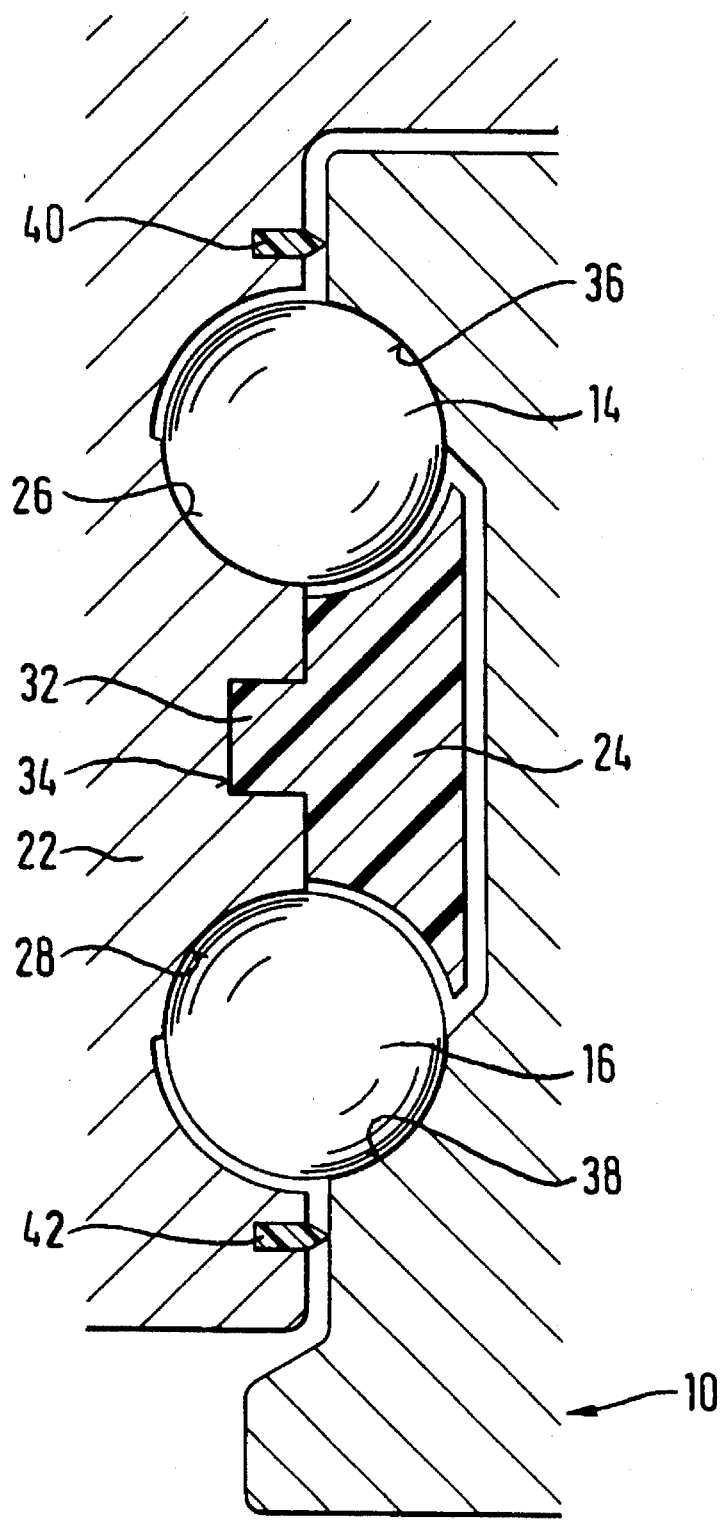
FIG. 3 shows, in a section taken through FIG. 2, the manner of engagement between the guide rail and the main body of the bearing.

FIG. 1 shows a guide rail 10 having a center-line or axis 11. A main body of a bearing 12, which is provided at each of its ends with an end plate 13, is guided on the guide rail 10. Bores on the main body of the bearing 12 receive fasteners by which an object such as the carriage or slide of a workpiece holder or of a toolholder of a machine tool is attached to the main bearing. In FIG. 2, it will be noted that the main body of the bearing 12 is guided on the guide rail 10 in the area of each lateral surface by two ball circuits 14, 16. FIG. 2 shows both ball circuits of a right leg 18 of the main body of the bearing 12 that is connected via a crosspiece 20 with a left leg 22. The balls of the ball circuits are held in contact with the rolling tracks of the main body of the bearing 12 by means of a retaining bar 24. This is shown in detail in FIG. 3, in which, unlike the case of FIG. 2, the left leg 22 is shown in rolling contact with the guide rail 10. The balls of the both ball circuits 14 and 16 are maintained in contact with rolling surfaces 26 and 28 of the left leg 22 by the retaining bar 24. The retaining bar 24 extends from an end plate 13, as shown in FIG. 5, and is, preferably formed integrally with the end plate. The retaining bar 24, at its extremity remote from the end plate in FIG. 5, meets the end of a further retaining bar, which is part of an end plate 13 located at the opposite end of the main body 12. The two retaining bars 24 are joined together at their ends which meet one another by means of mortise and tenon joints, as shown at 30 in FIG. 4. In addition, the retaining bars 24 are secured in retaining slots in the respective legs of the main body of the bearing by means of retaining strips 32, the said retaining slots being indicated by 34. The balls of the ball circuits 14 and 16 rest against rolling surfaces 36 and 38, respectively, of the guide rail 10. The area enclosing the ball circuits 14 and 16 between the guide rail 10 and the leg 22 of the main body of the bearing 12 is sealed by means of lip seals 40 and 42.

Figure 4:
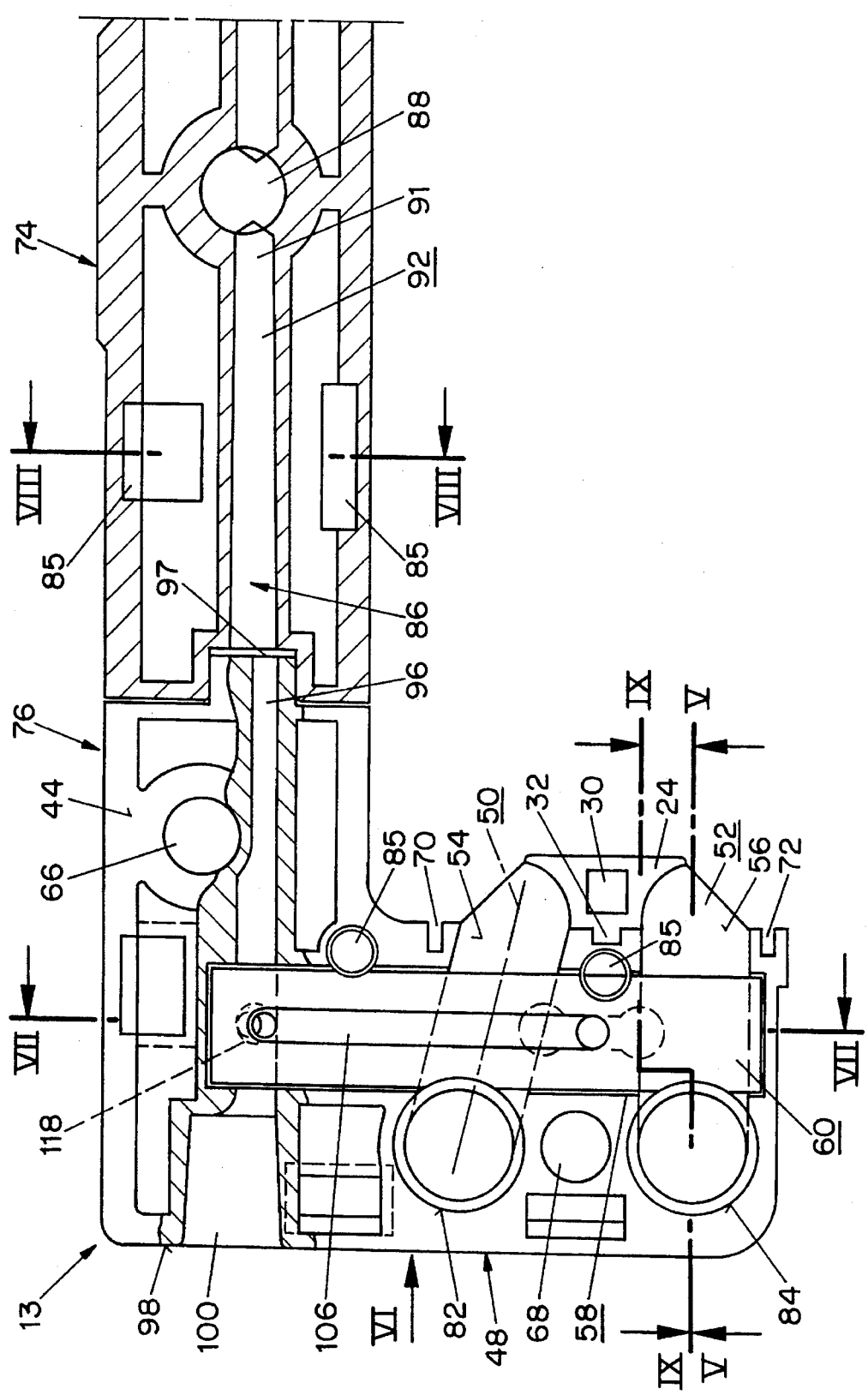
FIG. 4 is a view of the contact surfaces of an end plate along line IV—IV in FIG. 1, partially broken open.
Figure 5:
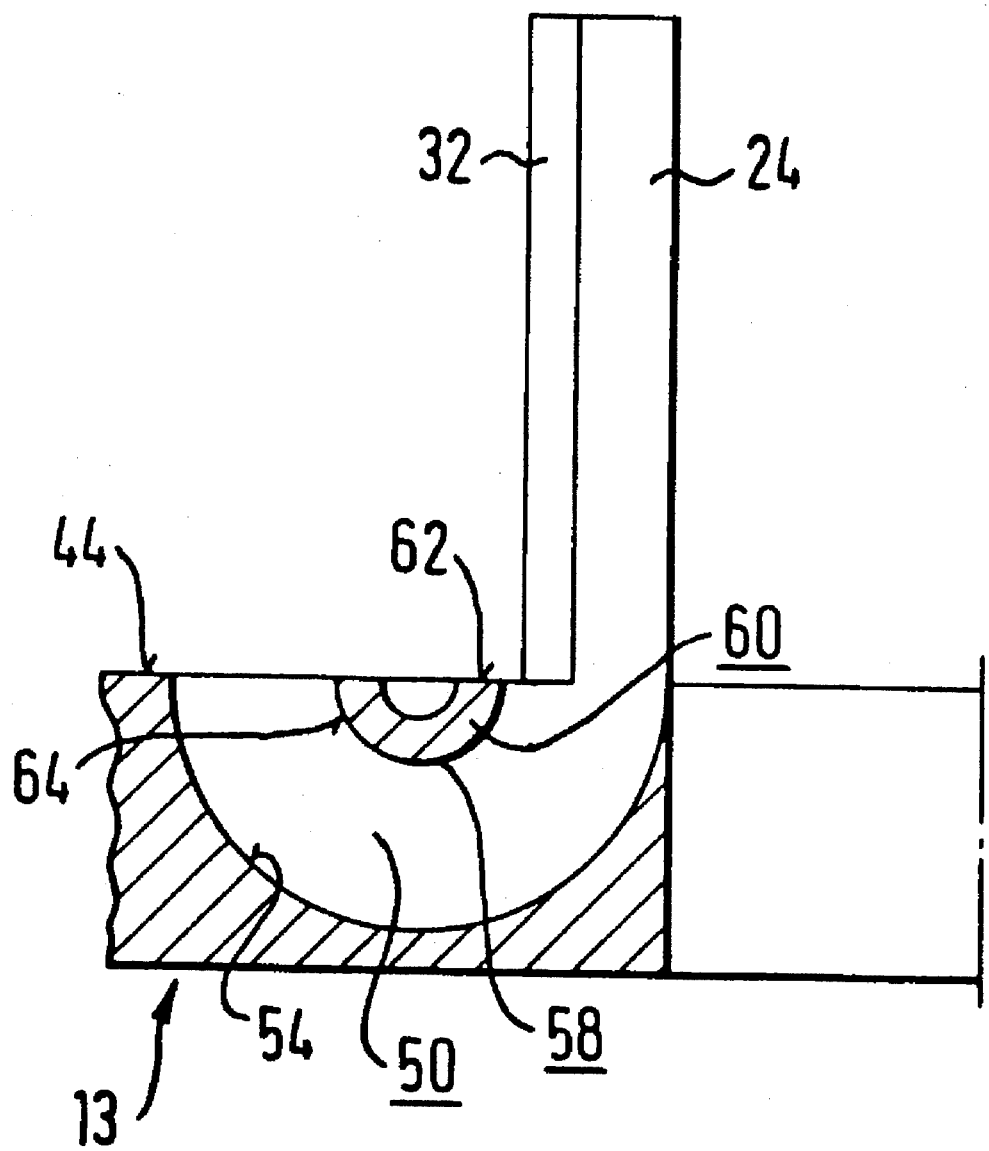
FIG. 5 shows the relationship between an end plate and a guide crosspiece for the rolling elements.

In FIG. 4, the details of the end plate 13 may be seen in a view looking at a contact surface 44 of the said end plate which, in accordance with FIG. 1, is secured against an end surface 46 of the main body of the bearing 12.

As can be seen in FIG. 4, there are in a leg portion 48 of the end plate two deflection ducts 50 and 52, which form outer deflecting surfaces 54 and 56, respectively, for deflection-arc segments of the ball circuits 14, 16. The two deflection ducts 50, 52 are crossed by a deflection-piece receiver duct 58 (see also FIG. 5). Within the deflection-piece receiver duct 58 there is a deflection piece 60, which, in accordance with FIG. 5, has a breast surface 62 and a convexly curved, in particular semicircular-cylindrical, back surface 64; the back surface 64 constitutes a radial inner deflecting surface for the balls of the deflection-arc segments of both ball circuits 14, 16.

The end plate 13 is fixed to the end surface 46 of the main body of the bearing by means of tightening bolts (not shown), which pass through tightening-bolt passages 66 and 68 in the leg area of the end plate 13. On the end plate leg 48 is the retaining bar 24 with one part of the mortise and tenon joint 30 and with the retaining strip 32 and slits 70 and 72 to accommodate the lip seals 40, 42 in accordance with FIG. 3.

As can be seen from FIG. 4, the end plate 13 is made up of a leg portion 48 and a central portion of the crosspiece 74. The central portion 74 of the crosspiece abuts against the portion 76 of the crosspiece located close to the leg. This means that the end plate 13 consists altogether of three parts. When adapting to different widths of the guide rail 10, different end plates can be formed through the use of various crosspiece central portions 74 while maintaining the leg portions 48.

Figure 9:
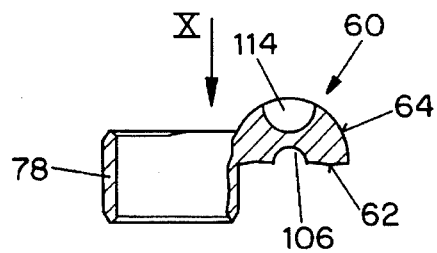
FIG. 9 is a section through a deflection piece along line IX—IX in FIG. 4.
Figure 10:
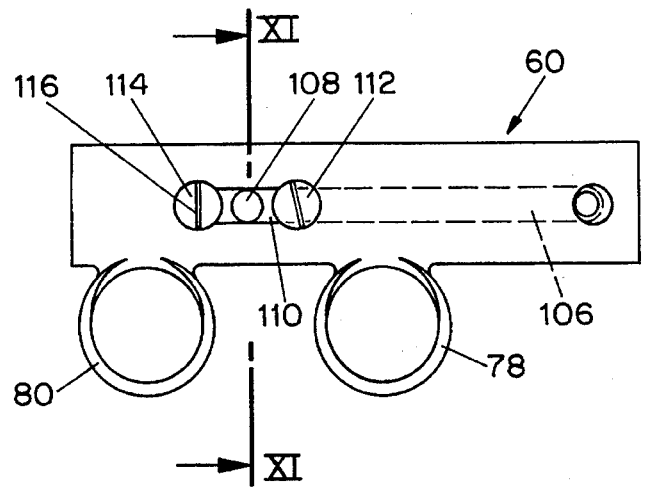
FIG. 10 is a view of the deflection piece in the direction of arrow X in FIG. 9.
Figure 11:
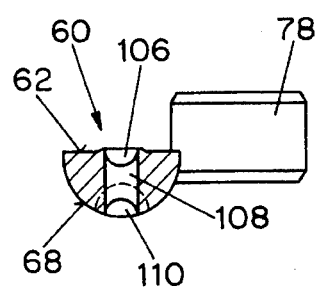
FIG. 11 is a section along line XI—XI in FIG. 10.

As can be seen from FIGS. 9, 10 and 11, the deflection piece 60 is provided with positioning rings 78 and 80. These positioning rings form a part of the ball race of the respective ball circuit, and, as can be seen from FIG. 4, one of their extremities is received in a recess 82 or 84 in the end plate, while their other extremity is inserted in enlarged portions of ball return bores (not shown) of the main body of the bearing 12.

Figure 6:
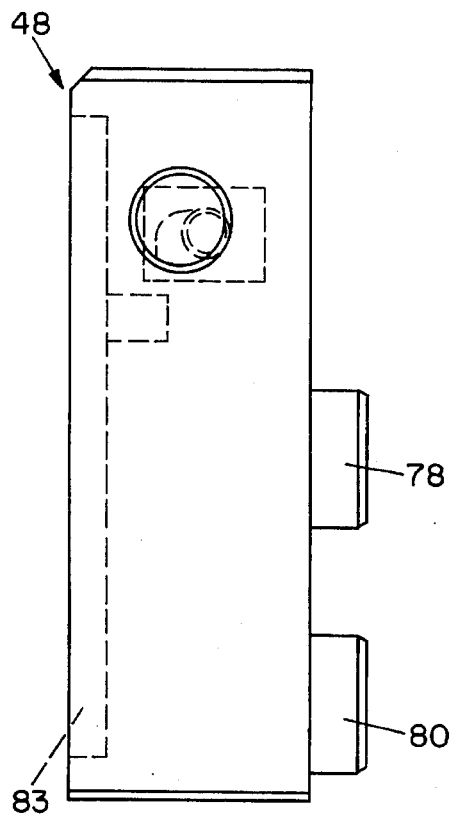
FIG. 6 is a side view of the end plate in the direction of arrow VI in FIG. 4.
Figure 7:
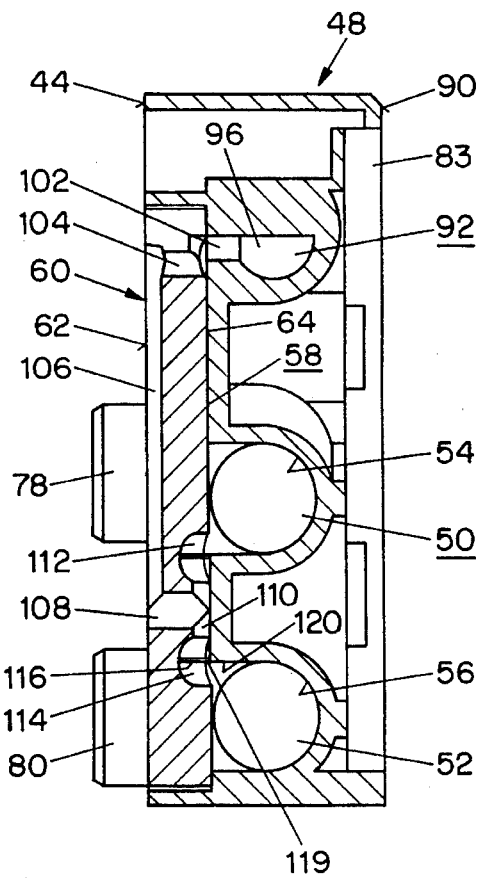
FIG. 7 is a section along line VII—VII in FIG. 4.

As can be seen from FIGS. 1, 6 and 7, on the side 90 of the end plate 13 away from the main body of the bearing 12, a U-shaped sealing strip 81 can be inserted in a sealing-strip recess 83 in the end plate 13, its inner contour matching the outer contour of the guide rail 10. This U-shaped sealing strip forms, together with the lip seals 40, 42, a lubricant chamber inside which the ball circuits 14 and 16 are substantially sealed in. The U-shaped sealing strips 81 are snap-fastened on the end plate by means of fastening recesses 85.

A lubricant supply system, all of which is designated by 86, is housed inside the end plate 13. Centrally, within the central portion 74 of the crosspiece of the end plate, a connection orifice 88 for the lubricant supply system is provided which opens into the side 90 of the end plate that faces away from the main body of the bearing and is constituted as a blind hole that ends before the contact surface 44 of the end plate. This connection orifice 88 is designed in such a way that a grease gun or liquid lubricant gun can be fitted on. For example, a grease nipple with a check valve may be inserted in the connection orifice 88, thus permitting lubricant to be squeezed in but preventing it from flowing back out. Connected to the connection orifice 88 is a lubricant channel 92 running parallel to the contact surface 44 and consisting of a channel part 94 inside the central portion 74 of the crosspiece of the end plate and a channel part 96 inside the portion of the crosspiece 76 of the end plate located near the leg. The two channel parts 94 and 96 are joined together in a substantially sealed connection by means of a coupling 97 at the boundary between the two parts 74 and 76 of the crosspiece. As shown in FIG. 4, the coupling 97 is constituted by a coupling projection and a coupling recess, which may be made conical for the sake of greater seal tightness and easier removal from the mold.

The lubricant channel 92 runs with its channel section 96 behind the receiver duct accommodating the deflection piece 58, or in other words, crosses it, as can be seen from FIG. 7. The channel section 96 is continued to a lateral surface 98 of the end plate 13 and widened, in an area close to the lateral surface 98, to a conical connection 100 which can accommodate either a closure plug or—in replacement of or in addition to a connecting nipple in the connection 88—a further connecting nipple. The same applies mutatis mutandis to the area of the leg part of the end plate 13 (not shown in FIG. 4).

As can be seen from FIG. 7, the lubricant-channel is connected, through a cross-bore 102 in the end plate, with a primary cross-bore 104 in the deflection piece 60. Positioned on the breast side 62 of the deflection piece 60 is a breast-surface duct 106 running in the longitudinal direction of the deflection piece 60. The breast-surface duct 106 is covered by being placed against the end surface 46 of the main body of the bearing 12. The cross-bores 102 and 104 run essentially at right angles with respect to the end surface 46 of the main body of the bearing 12. Starting from the breast-surface duct 106 is a secondary cross-bore 108, also running substantially at right angles with respect to the end surface 46 of the main body of the bearing and opening out into the deflecting surface, or in other words, the cylindrically curved back surface 64 of the deflection piece 60. Disposed in the top portion of the back surface 64 of the deflection piece 60 is a mouth channel 110 that is connected with the secondary cross-bore 108 and leads to the two deflection ducts 50, 52 in order to supply lubricant to the deflection ducts and hence to the ball circuits 14, 16.

Fitted to the ends of the mouth channel 110 are valve chambers 112 and 114 which are theoretically designed in the same manner. Positioned inside the approximately hemispherical valve chamber 114 is a valve diaphragm 116 that is approximately semi-circular, is attached along its semi-circular arc integrally with the deflection piece 60 and, with its essentially rectilinear free edge 119, faces a peripheral edge 120 of the deflection duct 52. When there is an increase in lubricant pressure, such as may be produced through the application of a lubricant gun at 88 or 100, lubricant penetrates into the area of the valve chambers 114 or 112, and the related valve diaphragm, e.g., 116, is deflected outward, so that lubricant reaches the area of the related deflection duct. The valve diaphragms may be designed in such a way that they offer the same resistance or intentionally different resistances to the two deflection ducts. It is thus ensured that the right quantities of lubricant reach the deflection ducts 50, 52. A return flow of lubricant from the deflection ducts is rendered, to all intents and purposes, impossible by the valve diaphragms. A redistribution of lubricant between the two deflection ducts is also thus prevented.

Figure 8:
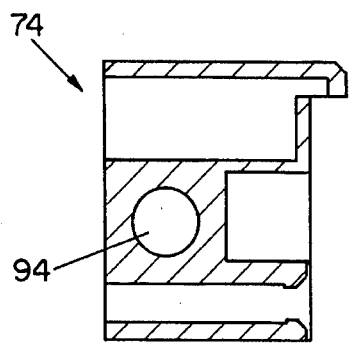
FIG. 8 is a section along line VIII—VIII in FIG. 4.

Further throttling devices and/or valves may be disposed in the path from the connection orifice 88 to the deflection ducts 50, 52 with a view to affecting the flow of lubricant in one way or another. Such throttling devices and/or valves may be installed inside the deflection piece 60 or in the area of lubricant channel 92 or at the connection between the lubricant channel 92 and the breast-surface duct 106, preferably proximate to the crossing 118. The flow of lubricant can also be affected by the design and mutual arrangement of the cross-bores 102 and 104 or 108, as well as by the cross-sectional shapes and transitions between the lubricant-channel sections 94 and 96. It can be seen from FIG. 7 that the lubricant-channel section 96 has a half-moon-shaped cross-section with a long cross-sectional axis running parallel to the axis 11 of the guide rail 10, while the lubricant-channel section 94 in accordance with FIG. 8 has a circular cross-section.

The fastening points 66, 68 may be limited to the leg portions 48 of the end plates 13 due to the fact that inside the lubricant-channel section 94 of the lubricant channel 92, the lubricant pressure is absorbed entirely within the central portion 74 of the crosspiece of the end plate, and there is no withdrawal or separating effect due to pressure of a lubricant acting between the crosspiece portion 74 and the main body of the bearing 12.

Figure 12:
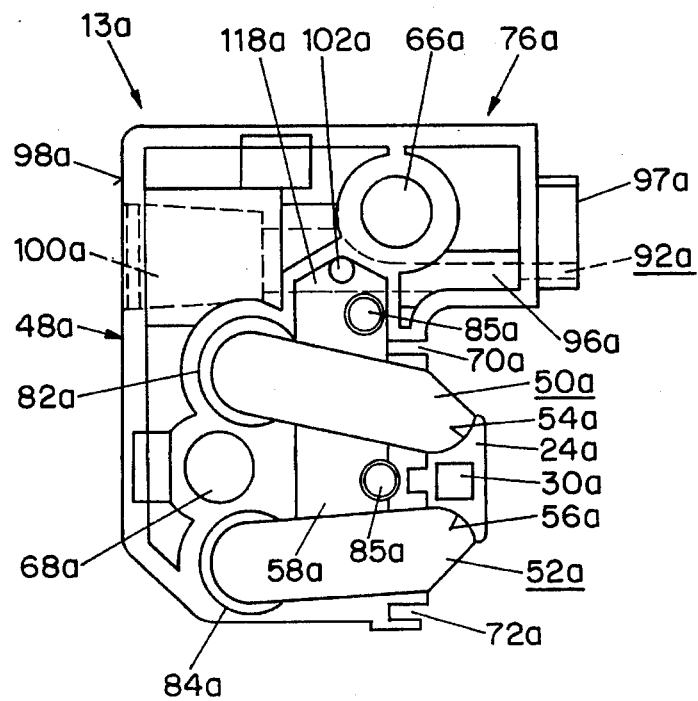
FIG. 12 is a view according to FIG. 4 of a partial end-plate in another form of embodiment.

As may be seen in FIGS. 12, 13 and 14, there is an alternative design of the end plate 13a and the related deflection piece 60a. Analogous elements are designated with the same reference numbers as in FIGS. 1–11, in each case with the addition of a letter a.

In FIG. 14, it will be seen that there is at the upper extremity 122a of the deflection piece 60a a valve blade 124a which is parallel to the principal plane of the end plate 13a when the deflection piece 60a is inserted in the end plate. This valve blade 124a covers over the end of the cross-bore 102a of the end plate (see FIG. 12). Only when there is an elevated lubricant pressure in the lubricant-channel 96a does the valve blade 124a lift away from the end of the cross-bore 102a, so that lubricant can again flow in the direction of the points of consumption. There is a corresponding valve on the right side of the end plate (not shown in FIG. 12). It is thus ensured that the flow-through resistances and pressure-drops on the way to the points of consumption are equalized in the crossing area 118a, independently of whether lubricant is fed in via the central connection at 88 (FIG. 4) or via the lateral connection 100a. In other respects, the embodiment in accordance with FIGS. 12–14 is the same as the embodiment in accordance with FIGS. 1–11. The flexibility of the valve blade 124a can be varied in a direction-dependent manner by means of a reinforcing web 126a.

What is set forth in the foregoing is, in particular, the combination of the closed-cross-section lubricant channel 92 with that portion of the lubricant supply system 104–114 that is formed inside the receiver duct accommodating the deflection piece 58. Attention should be drawn, in conclusion, to the fact that even the arrangement of the lubricant channel 92 with a closed cross-section within the material of the end plate 13 is of substantial significance from the standpoint of the invention. Such channels might also be disposed in the leg portions of the end plate, possibly in connection with the lubricant channel 92. In that case, the lubricant supply is also independent of the presence of deflection pieces and the accommodation of such deflection pieces in the deflection-piece receiver ducts.

We claim:

1. A linear guiding device, comprising a guide rail having a longitudinal axis, a main body of a bearing having at least one rolling-element circuit guiding the main body along the axis on the guide rail and having an end surface, an end plate attached to the end surface of the main body of the bearing, the end plate having a contact surface facing the end surface of the main body of the bearing, a deflection duct for the rolling-element circuit recessed into the contact surface of the end plate and constituting an outer deflecting surface for a deflection-arc segment of the rolling-element circuit, a deflection-piece receiver duct recessed into the contact surface of the end piece and arranged crosswise of the deflection duct, a deflection piece received in the deflection-piece receiver duct and extending across the deflection duct, the deflection piece having a breast surface facing and located proximate to the end surface of the main body of the bearing and a convex back-surface located opposite the outer deflecting surface and forming an inner deflecting-surface for the deflection-arc segment, at least a part of a lubricant-supply system for the rolling-element circuit being accommodated in the end plate, a portion of said part of the lubricant-supply system which is close to the rolling elements extending inside the deflection-piece receiver duct and being open toward the rolling elements of the rolling-element circuit in the area of the inner deflecting surface, said part of the lubricant-supply system having a lubricant channel running wholly inside the end plate and connected proximate to the deflection-piece receiver duct with channel portions of the lubricant-supply system that are accommodated in the deflection-piece receiver duct, said end plate being shaped from an end plate base material, said lubricant channel having a channel axis substantially parallel to the end surface of the main body of the bearing, said lubricant channel being surrounded along at least a part of its length along said channel axis by surrounding wall means, said surrounding wall means being annularly closed around said channel axis and integrally made of said end plate base material.

2. A linear guiding device according to claim 1, wherein the deflection-piece receiver duct has a continuation which is spaced apart from a crossing point of the deflection-piece receiver duct with the deflection duct and which is located proximate to the lubricant channel, and wherein a connection passage is provided adjacent said continuation between the lubricant channel and said channel portions of the lubricant-supply system that are accommodated within the deflection-piece receiver duct.

3. A linear guiding device according to claim 1, wherein the lubricant channel runs essentially parallel to the contact surface and crosses a continuation of the deflection-piece receiver duct in a bottom region thereof, and wherein there is a connection in the region of said crossing between the lubricant channel and the channel portions of the lubricant-supply system that are accommodated within the deflection-piece receiver duct.

4. A linear guiding device according to claim 1 wherein the lubricant channel crosses a continuation of the deflection-piece receiver duct at an angle which is approximately a right angle.

5. A linear guiding device according to claim 1, wherein the channel portions of the lubricant-supply system that are accommodated within the deflection-piece receiver duct include a breast-surface slot which runs in a lengthwise direction of the deflection piece in the breast surface of the deflection piece, and the breast-surface slot is covered by the end surface of the main body of the bearing.

6. A linear guiding device according to claim 5, wherein the breast-surface slot is connected with the lubricant channel by means of a primary cross-channel on the side of the deflection piece, which primary cross-channel extends across the deflection piece in a manner which is essentially orthogonal to the breast-surface.

7. A linear guiding device according to claim 6, wherein the primary cross-channel on the side of the deflection piece connects to a second cross-channel on the side of the end plate, which second cross-channel runs essentially orthogonal to the contact surface of the end plate and is connected to the lubricant channel.

8. A linear guiding device according to claim 5, wherein the breast-surface slot is connected, by means of a secondary cross-channel of the deflection piece, with a lubricant-discharge system located in the region of the back surface of the deflection piece.

9. A linear guiding device according to claim 8, wherein the main body of the bearing has at least two rolling element circuits and the deflection piece is associated with and crosses the deflection-arc segments of said at least two rolling-element circuits, and a secondary cross-channel of the deflection-piece extends across the deflection piece at a point between the respective crossing points of the deflection piece with the two deflection-arc segments.

10. A linear guiding device according to claim 9, wherein the secondary cross-channel of the deflection piece is connected with a discharge duct arranged in the convex back-surface of the deflection piece, said discharge duct runs in a direction essentially parallel to a longitudinal axis of the deflection piece, is covered by a duct-delimiting surface of the deflection-piece receiver duct, and runs from the secondary cross-channel of the deflection piece to respective deflection ducts of the two deflection-arc segments.

11. A linear guiding device according to claim 1, wherein there is provided in said part of the lubricant-supply system within the end plate at least one flow control device comprising one of a throttle point, a one-way check valve, and an excess-pressure valve.

12. A linear guiding device according to claim 11, wherein a valve is located at an end of a discharge duct which faces towards a deflection duct.

13. A linear guiding device according to claim 12, wherein the valve located at the end of the discharge duct is a blade-type valve having a blade that is unitary with the deflection piece.

14. A linear guiding device according to claim 13, wherein the blade-type valve is arranged in a valve chamber of the deflection piece, which valve chamber partially overlaps the respective deflection duct.

15. A linear guiding device according to claim 14, wherein the blade-type valve has a blade with a free edge which faces towards the back surface of the deflection piece and is connected around a remainder of its periphery in an essentially unitary manner with the deflection piece.

16. A linear guiding device according to claim 15, wherein the free edge of the blade approximately coincides with a delimiting edge of a deflection duct.

17. A linear guiding device according to claim 11, wherein said flow control device is arranged in the region of a connection point between the lubricant channel and the channel portions of the lubricant-supply system that are accommodated within the deflection-piece receiver duct.

18. A linear guiding device according to claim 1, wherein at least one valve, comprising one of a check valve and an excess-pressure valve, is provided at at least one discharge point of the channel portions of the lubricant-supply system that are accommodated in the deflection-piece receiver duct, the valve being arranged to open towards the deflection-arc segment.

19. A linear guiding device according to claim 18, wherein the valve has a valve blade which is capable of elastic deflection and is unitary with the deflection piece.

20. A linear guiding device according to claim 1, wherein the main body of the bearing is essentially U-shaped and includes two leg portions and a crosspiece portion extending between the leg portions, the leg portions being disposed adjacent opposite side surfaces of the guide rail, and wherein there is between each side surface of the guide rail and a corresponding leg portion of the main body of the bearing at least one rolling-element circuit, and wherein the end plate is essentially U-shaped and has one end-plate crosspiece portion and two end-plate leg portions, each of the end-plate leg portions having at least one deflection duct for respective rolling-element circuits of the main body of the bearing.

21. A linear guiding device according to claim 20, wherein at least two rolling-element circuits are provided in each leg portion of the main body of the bearing, and the deflection ducts in each end-plate leg portion include a single deflection piece received in a deflection-piece receiver duct in each end-plate leg portion.

22. A linear guiding device according to claim 20, wherein each deflection-piece receiver duct and the deflection piece extends to the height of the end-plate crosspiece portion and at the height of the end-plate crosspiece portion is connected with the lubricant channel, and wherein the lubricant channel includes a portion located within the end-plate crosspiece portion.

23. A linear guiding device according to claim 22, wherein the lubricant channel extends through the end-plate crosspiece portion, traversing between two side surfaces of the two end-plate leg portions.

24. A linear guiding device according to claim 23, wherein the lubricant channel has a lubricant supply point at at least one side-surface of at least one of the end-plate leg portions.

25. A linear guiding device according to claim 20, wherein the lubricant channel has a lubricant supply point in a central region of the end-plate crosspiece portion.

26. A linear guiding device according to claim 1, wherein the lubricant channel has, at least along a part of its length, an oblong cross-section, and wherein a longer axis of the oblong cross-section lies essentially parallel to the lengthwise axis of the guide rail.

27. A linear guiding device according to claim 1, wherein the end plate is composed in building-block fashion out of partial end-plates, whereby there are arranged, in individual partial end-plate parts portions of the lubricant-supply system which form an essentially tight connection during the assembly of the partial end-plates into the end plate.

28. A linear guiding device according to claim 27, wherein, in order to connect the parts of the lubricant-supply system, there are formed in one piece, at the partial end-plates, plug-in type connecting-elements which obligatorily form an essentially tight plug-in type connection when the partial end-plates are assembled.

29. A linear guiding device according to claim 28, wherein the plug-in type connecting-elements are formed by complementary projections and recesses in abutting surfaces of the partial end-plates.

30. A linear guiding device according to claim 27, wherein the partial end-plates encompass two leg-end-plates, each with an end-plate crosspiece section located close to the leg, and with a central end-plate crosspiece section.

31. A linear guiding device according to claim 1, wherein at least one guide member for the guidance of rolling elements is attached to the end plate and is received in the main body of the bearing.

32. A linear guiding device according to claim 31, wherein said at least one guide member is unitary with the end plate.

33. A linear guiding device according to claim 1, wherein the deflection piece includes at least one positioning ring that is received in an enlarged end portion of a rolling-element return channel of the main body of the bearing.

34. A linear guiding device according to claim 1, wherein the deflection piece includes at least one positioning ring that is received in a recess in the end plate and adjacent to the deflection duct.

35. A linear guiding device according to claim 1, wherein the end plate is of synthetic material.

36. A linear guiding device according to claim 35, wherein the end plate is formed by injection-molding.

37. A linear guiding device according to claim 35, wherein the end plate is formed by casting.

38. A linear guiding device according to claim 35, wherein the deflection piece is formed by injection-molding.

39. A linear guiding device according to claim 35, wherein the deflection piece is formed by casting.

40. A linear guiding device according to claim 1, wherein the deflection piece is of synthetic material.

41. A valve for a lubricant-supply system of a bearing, the system supplying several lubricant-consumption points that are supplied in parallel, comprising a valve blade which protrudes into a lubricant-conveying path and is essentially orthogonal to a flow-through direction, which is fixed at part of its periphery to a delimiting surface of the lubricant-conveying path and at a remaining periphery faces opposite the delimiting surface of the lubricant-conveying path, and which is adapted to be deflected in a direction parallel to the flow-through direction of the lubricant-conveying path.

42. A valve according to claim 41, wherein the blade has, in a first deflection direction, a lower resistance to deflection and, in a second deflection direction, a greater resistance to deflection.

43. A linear guiding device according to claim 42, wherein the valve blade lies with its remaining periphery proximate to an enlargement in the cross-section of the lubricant-conveying path.

* * * * *